United States Patent
Huang-Fu et al.

(10) Patent No.: US 11,259,205 B2
(45) Date of Patent: Feb. 22, 2022

(54) IP MULTIMEDIA CORE NETWORK SUBSYSTEM SIGNALING IN 5GS

(71) Applicant: MEDIATEK INC., Hsin-Chu (TW)

(72) Inventors: Chien-Chun Huang-Fu, Hsin-Chu (TW); Yu-Hsin Lin, Hsin-Chu (TW); Po-Ying Chuang, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 107 days.

(21) Appl. No.: 16/866,787

(22) Filed: May 5, 2020

(65) Prior Publication Data

US 2020/0359254 A1 Nov. 12, 2020

Related U.S. Application Data

(60) Provisional application No. 62/843,638, filed on May 6, 2019.

(51) Int. Cl.
*H04W 28/02* (2009.01)
*H04L 65/1016* (2022.01)
*H04W 76/25* (2018.01)
*H04W 80/10* (2009.01)

(52) U.S. Cl.
CPC ..... *H04W 28/0268* (2013.01); *H04L 65/1016* (2013.01); *H04W 76/25* (2018.02); *H04W 80/10* (2013.01)

(58) Field of Classification Search
None
See application file for complete search history.

(56) References Cited

U.S. PATENT DOCUMENTS

| | | | | |
|---|---|---|---|---|
| 2019/0335534 A1* | 10/2019 | Atarius | ............... | H04L 65/1006 |
| 2020/0068445 A1 | 2/2020 | Wu et al. | | |
| 2020/0275332 A1* | 8/2020 | Chong | .............. | H04W 28/0819 |

FOREIGN PATENT DOCUMENTS

| | | |
|---|---|---|
| CN | 109391932 A | 8/2017 |
| WO | WO2018128494 A1 | 1/2017 |
| WO | WO2018202094 A1 | 5/2017 |
| WO | WO2019031941 A1 | 8/2017 |

OTHER PUBLICATIONS

International Search Report and Written Opinion of International Search Authority for PCT/CN2020/088790 dated Jul. 30, 2020 (8 pages).

(Continued)

*Primary Examiner* — Christine T Duong
(74) *Attorney, Agent, or Firm* — Imperium Patent Works; Zheng Jin

(57) ABSTRACT

A method of supporting IMS signaling over EPS bearer or QoS flow upon inter-system change between EPS and 5GS is proposed. When inter-system change from 5GS to EPS occurs, a PDU session is converted to a PDN connection having multiple EPS bearers. The EPS bearer mapped from the QoS flow that is used for IMS signaling in 5GS is the EPS bearer for IMS signaling in EPS. When inter-system change from EPS to 5GS occurs, a PDN connection is converted to a PDU session having multiple QoS flows. The QoS flow that is associated with the default QoS rule is the QoS flow for IMS signaling in 5GS, regardless of which EPS bearer is used for IMS signaling in EPS.

19 Claims, 4 Drawing Sheets

(56) References Cited

OTHER PUBLICATIONS

Taiwan IPO, office action for the TW patent application 109115033 (no English translation is available) dated Feb. 26, 2021 (8 pages).
3GPP TR 24.890 V15.1.0 (Mar. 2018), 3rd Generation Partnership Project; Technical Specification Group Core Network and Terminals; 5G System—phase 1; CT WG1 Aspects (Release 15) *sections 6-12*.

* cited by examiner

IP MULTIMEDIA CORE NETWORK SUBSYSTEM SIGNALING IN 5GS

CROSS REFERENCE TO RELATED APPLICATIONS

This application claims priority under 35 U.S.C. § 119 from U.S. Provisional Application No. 62/843,638, entitled "IM CN Subsystem Signaling in 5GS", filed on May 6, 2019, the subject matter of which is incorporated herein by reference.

TECHNICAL FIELD

The disclosed embodiments relate generally to wireless communication, and, more particularly, to method of supporting IP multimedia subsystem signaling with interworking between EPS and 5GS.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems (5GS).

In 4G evolved packet system (EPS), a Packet Data Network (PDN) connectivity procedure is an important process when LTE communication system accesses to the packet data network. The purpose of PDN connectivity procedure is to setup a default EPS bearer between a UE and the packet data network. In 5G, a Protocol Data Unit (PDU) session establishment is a parallel procedure of the PDN connectivity procedure in 4G. A PDU session defines the association between the UE and the data network that provides a PDU connectivity service. Each PDU session is identified by a PDU session ID (PSI), and may include multiple QoS flows and QoS rules. In 5G network, QoS flow is the finest granularity for QoS management to enable more flexible QoS control. The concept of QoS flow in 5G is like EPS bearer in 4G. When a QoS flow is added, the network can provide a QoS flow description IE to the UE, which comprises a list of QoS flow descriptions. Each QoS flow description comprises a QoS flow identifier (QFI), a QoS flow operation code, a number of QoS flow parameters, and a QoS flow parameters list. Each parameter included in the parameters list consists of a parameter identifier that identifies the corresponding parameter. One of the parameter identifiers is the EPS bearer identity (EBI), which is used to identify the EPS bearer that is mapped to or associated with the QoS flow.

As set forth in the 3GPP, IP Multimedia Subsystem (IMS) is a core network that provides IP multimedia services to user equipments (UEs) over an Internet Protocol (IP) network. Historically, mobile phones have provided voice call services over a circuit-switched (CS) network, rather than strictly over an IP packet-switched (PS) network. Alternative methods of delivering voice or other multimedia services over IP have become available on smartphones (e.g. VoIP or Skype), but they have not become standardized across the industry. IMS is an architectural framework to provide such standardization. IMS is able to communicate with UEs through different types of access network, such as a wireless local area network (WLAN), an Ethernet network, a packet data network (PDN), or another type of access network. IMS is a new way to dial PS call over LTE or over New Radio (NR) (Voice over IP or Voice over LTE or Voice over NR) instead of fallback to 2G/3G legacy CS call. Session initiation protocol (SIP) is used for IMS signaling.

Specified by 3GPP, when establishing a 5GS PDU session with a QoS flow used for SIP signaling, the UE shall indicate to the network, by setting the IM CN Subsystem Signaling Flag in the extended Protocol Configuration Options information element (ePCO IE) in the PDU SESSION ESTABLISHMENT REQUEST message, that the request is for SIP signaling. In 5GS, the "IM CN Subsystem Singling Flag" is required to be included in the 5GSM messages for 1) UE to indicate the network that the PDU session is established for IMCN subsystem signaling, and 2) network to indicate to UE which QoS flow is for IM CN subsystem signaling. However, consider new features introduced in 5GS, multiple QoS flow description operation on different QoS flows can be included in a single 5GSM message. When an intersystem change between EPS and 5GS occurs, an EPS bearer can be associated with multiple QoS flows. Therefore, the UE may not be able to determine which QoS flow or which EPS bearer is for IM CN subsystem signaling after intersystem change.

SUMMARY

A method of supporting IMS signaling over EPS bearer or QoS flow upon inter-system change between EPS and 5GS is proposed. When inter-system change from 5GS to EPS occurs, a PDU session is converted to a PDN connection having multiple EPS bearers. The EPS bearer mapped from the QoS flow that is used for IMS signaling in 5GS is the EPS bearer for IMS signaling in EPS. When inter-system change from EPS to 5GS occurs, a PDN connection is converted to a PDU session having multiple QoS flows. The QoS flow that is associated with the default QoS rule is the QoS flow for IMS signaling in 5GS, regardless of which EPS bearer is used for IMS signaling in EPS.

In one embodiment, a UE maintains a Protocol data unit (PDU) session in a 5G system (5GS). The PDU session is configured with one or more QoS flows and a QoS flow from the one or more QoS flows is selected for IP multimedia subsystem (IMS) signaling. The UE performs an inter-system change from 5GS to an evolved packet system (EPS). The one or more QoS flows are mapped to an EPS bearer of a packet data network (PDN) connection corresponds to the PDU session. The UE determines an EPS bearer that is mapped to the QoS flow that is used for IMS signaling. The UE transmits and receives IMS signaling over the determined EPS bearer in EPS.

In another embodiment, a UE maintains a Packet data network (PDN) connection in an evolved packet system (EPS). The PDN connection is configured with one or more EPS bearers, and an EPS bearer from the one or more EPS bearers is selected for IP multimedia subsystem (IMS) signaling. The UE performs an inter-system change from EPS to a 5G system (5GS). Each EPS bearer is mapped to one or more QoS flows of a protocol data unite (PDU) session corresponds to the PDN connection. The UE determines a QoS flow that includes a default QoS rule to be used for IMS signaling for the PDU session in 5GS. The UE transmits and receives IMS signaling over the determined QoS flow in 5GS.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
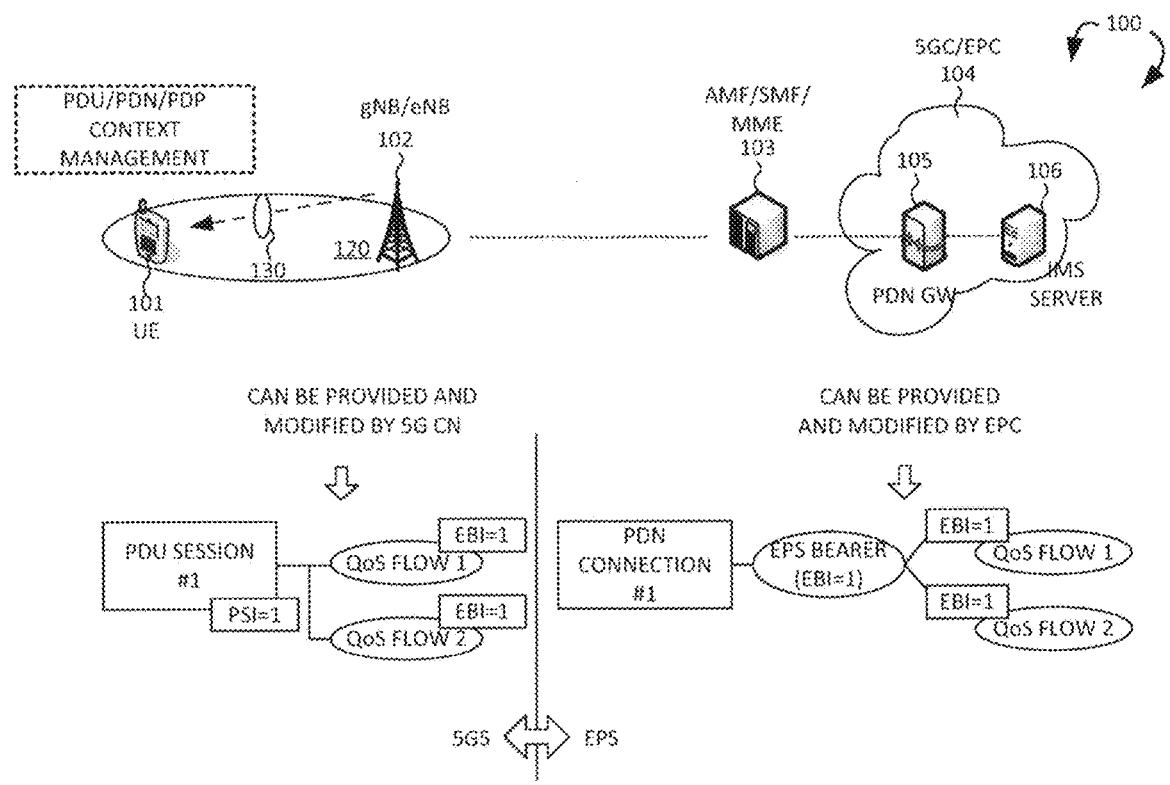
FIG. 1 illustrates an exemplary 5G/4G network supporting IP multimedia subsystem (IMS) signaling in accordance with one novel aspect.

FIG. 1 illustrates an exemplary 5G/4G network supporting IP multimedia subsystem (IMS) signaling in accordance with one novel aspect. 5G new radio (NR) network 100 comprises a user equipment UE 101, a base station gNB/eNB 102, an access and Mobility Management Function (AMF)/Session Management Function (SMF) 103, and a 5G/4G core network 5GC/EPC 104 comprising a packet data network (PDN) gateway (GW) 105 and an IP multimedia subsystem (IMS) server 106. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF/SMF 103 communicates with gNB 102 and 5GC 104 for access and mobility management and PDU session management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS networks are packet-switched (PS) Internet Protocol (IP) networks. This means that the networks deliver all data traffic in IP packets, and provide users with Always-On IP Connectivity. When UE joins a 5GS network, a Packet Data Network (PDN) address (i.e., the one that can be used on the PDN) is assigned to the UE for its connection to the PDN. In 4G, a PDN connectivity procedure is to setup a Default EPS Bearer between a UE and the packet data network. EPS has defined the Default EPS Bearer to provide the IP Connectivity that is Always-On. In 5G, a Protocol Data Unit (PDU) session establishment procedure is a parallel procedure of a PDN connectivity procedure in 4G. A PDU session defines the association between the UE and the data network that provides a PDU connectivity service. In 5G network, QoS flow is the finest granularity for QoS management to enable more flexible QoS control. The concept of QoS flow in 5G is like the EPS bearer context in 4G.

In 5GS, each PDU session is identified by a PDU session ID (PSI), and may include multiple QoS flows and QoS rules. Each QoS flow is identified by a QoS flow ID (QFI) which is unique within a PDU session. There can be more than one QoS rule associated with the same QoS flow. A default QoS rule is required to be sent to the UE for every PDU session establishment and it is associated with a QoS flow. Within a PDU session, there should be one and only one default QoS rule. The QoS flow that is associated with the default QoS rule sometimes is referred to as the default QoS flow. On the other hand, in EPS, each PDN connection is identified by a PDN connection ID, and may include multiple EPS bearers.

When a QoS flow is added, the network can provide a QoS flow description IE to the UE, which comprises a list of QoS flow descriptions. Each QoS flow description comprises a QoS flow identifier (QFI), a QoS flow operation code, a number of QoS flow parameters, and a QoS flow parameters list. Each parameter included in the parameters list consists of a parameter identifier that identifies the corresponding parameter. One of the parameter identifiers is the EPS bearer identity (EBI), which is used to identify the EPS bearer that is mapped to or associated with the QoS flow. Upon inter-system change from 5GS to EPS, PDU session is converted to PDN connection, and QoS flows are mapped to corresponding EPS bearers. Similarly, upon inter-system change from EPS to 5GS, PDU session is converted to PDN connection, and EPS bearers are mapped to corresponding QoS flows.

As set forth in the 3GPP, IP Multimedia Subsystem (IMS) is a core network that provides IP multimedia services to user equipments (UEs) over an Internet Protocol (IP) network. Session initiation protocol (SIP) is used for IMS signaling. When establishing a 5GS PDU session with a QoS flow used for SIP signaling, the UE shall indicate to the network, by setting the IM CN Subsystem Signaling Flag in the extended Protocol Configuration Options information element (ePCO IE) in the PDU SESSION ESTABLISHMENT REQUEST message, that the request is for SIP signaling. In 5GS, the "IM CN Subsystem Singling Flag" is required to be included in the 5GSM messages for 1) UE to indicate the network that the PDU session is established for IMCN subsystem signaling, and 2) network to indicate to UE which QoS flow is for IM CN subsystem signaling. However, consider new features introduced in 5GS, multiple QoS flow description operation on different QoS flows can be included in a single 5GSM message. When an intersystem change between EPS and 5GS occurs, an EPS bearer can be associated with multiple QoS flows. Therefore, the UE may not be able to determine which QoS flow or which EPS bearer is for IM CN subsystem signaling after inter-system change between EPS and 5GS.

Accordingly, a method of supporting IMS signaling over EPS bearer or QoS flow upon inter-system change between EPS and 5GS is proposed. When inter-system change from 5GS to EPS occurs, the EPS bearer mapped from the QoS flow for IMS signaling in 5GS is the EPS bearer for IMS signaling in EPS. When inter-system change from EPS to 5GS occurs, the QoS flow that is associated with the default QoS rule is the QoS flow for IMS signaling in 5GS, regardless of which EPS bearer is used for IMS signaling in EPS. In the example of FIG. 1, UE 101 establishes a PDU session #1 in 5G system. PDU session #1 includes two QoS flows, QoS flow #1 and QoS flow #2. QoS flow #1 is the default QoS flow and is mapped to an EPS bearer with EBI=1. QoS flow #2 is also mapped to the EPS bearer with EBI=2. QoS flow #1 is used for IMS signaling in 5GS. Upon inter-system change to EPS, PDU session #1 is converted to PDN connection #1 having a default EPS bearer with EBI=1, and both QoS flow #1 and QoS flow #2 are mapped to the default EPS bearer. The default EPS bearer with EBI=1 is used for IMS signaling in EPS. Upon inter-system change from EPS to 5GS, the QoS flow #1 associated to the default QoS rule is used for IMS signaling in 5GS.

Figure 2:
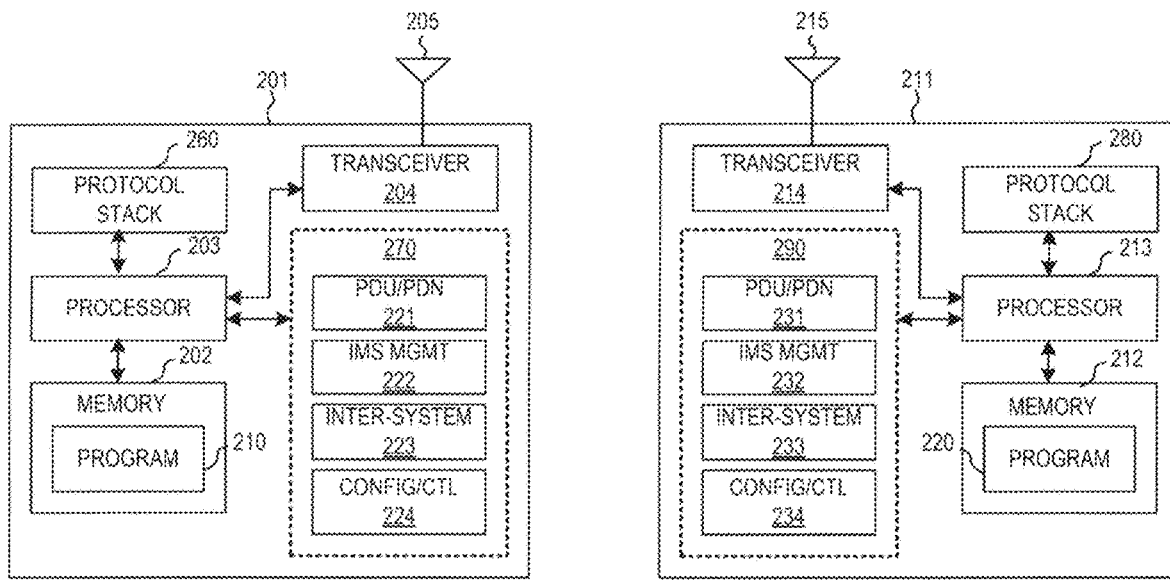
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session and PDN connection handling circuit 231 handles PDU/PDN establishment and modification procedures. IMS management circuit 232 handles IMS registration and signaling for UE. Inter-system circuit 233 handles handover and intersystem change functionality. Configuration and control circuit 234 provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session and PDN connection handling circuit 221 that performs PDU session and PDN connection establishment and modification procedures with the network, an IMS management circuit 222 that handles IMS registration and SIP signaling, an inter-system handling circuit 223 that handles handover and inter-system change functionalities, and a config and control circuit 224 that handles configuration and control parameters for mobility management and session management.

Figure 3:
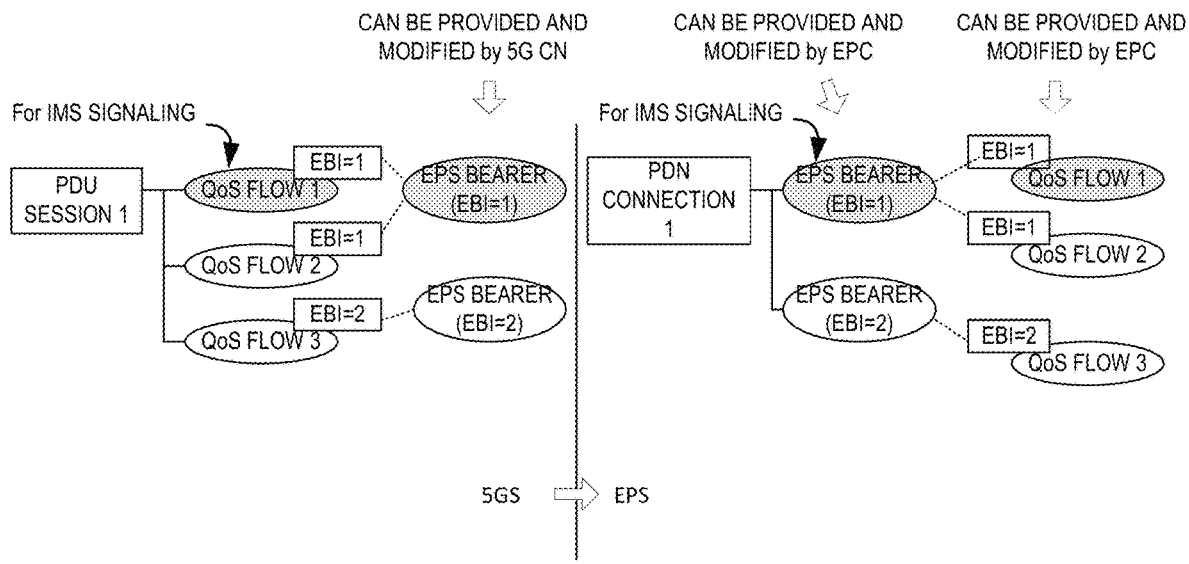
FIG. 3 illustrates a first embodiment of supporting IMS signaling in EPS after inter-system change from 5GS to EPS.

FIG. 3 illustrates a first embodiment of supporting IMS signaling in EPS after inter-system change from 5GS to EPS. In the embodiment of FIG. 3, a PDU session 1 (PSI=1) is first established in 5GS or transferred from EPS. The PDU session comprises three QoS flows. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. In this example, QoS flow1 and flow2 are associated to EPS bearer with EBI=1, and QoS flow3 is associated to EPS bearer with EBI=2. QoS flow1 is the QoS flow that includes a default QoS rule. The 5GSM parameters for PDU session 1 are provided and modified by 5G CN. When UE performs inter-system change from 5GS to EPS, the PDU session 1 is transferred to a corresponding PDN connection 1. The 5GSM parameters for PDU session 1 are mapped to PDN connection 1. Accordingly, PDN connection 1 has two EPS bearers, EBI=1 is the default EPS bearer and is associated to QoS flow1 and flow2, and EBI=2 is a dedicated EPS bearer and is associated to QoS flow3.

For IMS services, UE needs to register to an IMS server using SIP signaling. When establishing a 5GS PDU session with a QoS flow used for SIP signaling, the UE shall indicate to the network, by setting the IM CN Subsystem Signaling Flag in the extended Protocol Configuration Options information element (ePCO IE) in the PDU SESSION ESTABLISHMENT REQUEST message, that the request is for SIP signaling. In 5GS, the "IM CN Subsystem Singling Flag" is required to be included in the 5GSM messages, which carries the ePCO IE for 1) UE to indicate the network that the PDU session is established for IM CN subsystem signaling, and 2) optionally network to indicate to UE which QoS flow is for IM CN subsystem signaling in the PDU SESSION ESTABLISHMENT ACCEPT message. The QoS flow of the default QoS rule is used for IM CN subsystem signaling.

When an intersystem change occurs from 5GS to EPS, an EPS bearer can be associated with multiple QoS flows.

Therefore, the UE may not be able to determine which EPS bearer is for IM CN subsystem signaling after the inter-system change. In the example of FIG. 3, QoS flow1 of PDU session 1 is used for IMS signaling. Because QoS flow1 is associated to the default EPS bearer with EBI=1, the default EPS bearer is used for IMS signaling in EPS. Note that EPS bearer with EBI=1 is associated to multiple QoS flows, e.g., QoS flow1 and QoS flow2, as long as one of the QoS flows is used for IMS signaling in 5GS, then the corresponding EPS bearer is used for IMS signaling in EPS. In addition, the network can modify a different QoS flow, e.g., QoS flow3, to be used for IMS signaling. In this case, since EPS bearer with EBI=2 is mapped to QoS flow3, EPS bearer with EBI=2 will be used for IMS signaling in EPS after inter-system change.

Figure 4:
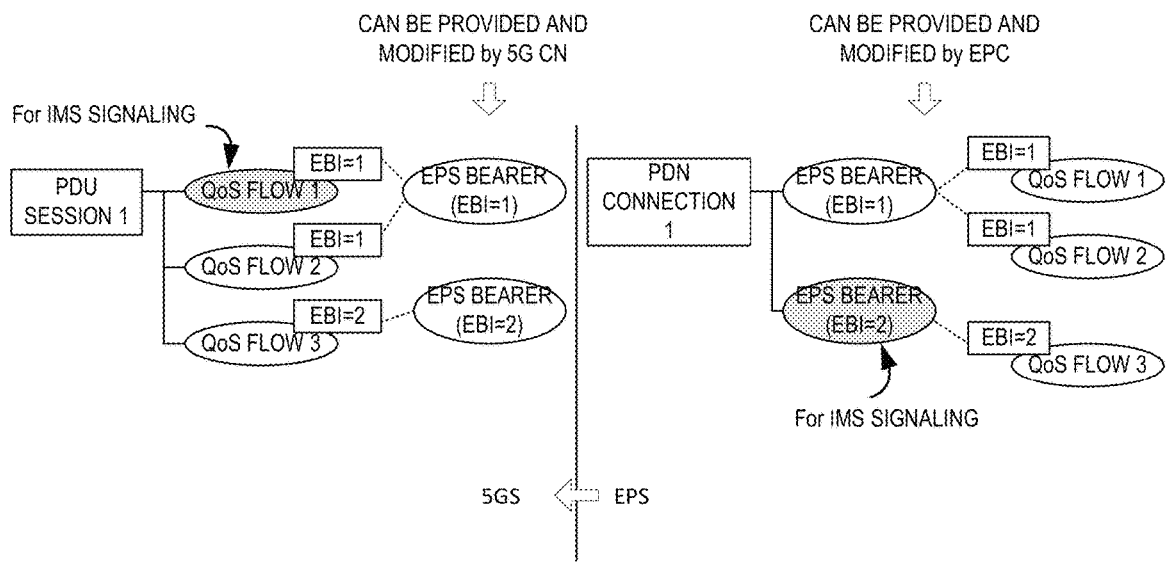
FIG. 4 illustrates a second embodiment of supporting IMS signaling in 5GS after inter-system change from EPS to 5GS.

FIG. 4 illustrates a second embodiment of supporting IMS signaling in 5GS after inter-system change from EPS to 5GS. In the embodiment of FIG. 4, a PDN connection 1 is first established in EPS or transferred from 5GS. The PDN connection comprises a default EPS bearer with EBI=1 and a dedicated EPS bearer with EBI=2. For interworking to 5GS, the default EPS bearer is associated with QoS flow1 and QoS flow2 of a corresponding PDU session, and the dedicated EPS bearer is associated with QoS flow3. The EPS bearer contexts of the PDN connection and 5GSM parameters can be provided and modified by EPC. In one example, the dedicated EPS bearer with EBI=2 is used for IMS signaling, e.g., by setting the IM CN Subsystem Signaling Flag in PCO IE via bearer modification procedure.

When an inter-system change occurs from EPS to 5GS, an EPS bearer can be associated with multiple QoS flows. Therefore, the UE may not be able to determine which QoS flow is for IM CN subsystem signaling after the inter-system change. In the example of FIG. 4, EPS bearer 1 is mapped to QoS flow1 and QoS flow2, while EPS bearer 2 is mapped to QoS flow3. Since EPS with EBI=2 is used for IMS signaling in EPS, it is possible that QoS flow3 can be used for IMS signaling in 5GS. However, in order to prevent the potential confusion when EPS bearer is associated with multiple QoS flows, it is better to always use the default QoS flow for IMS signaling in 5GS, regardless of the corresponding EPS bearer association.

Figure 5:
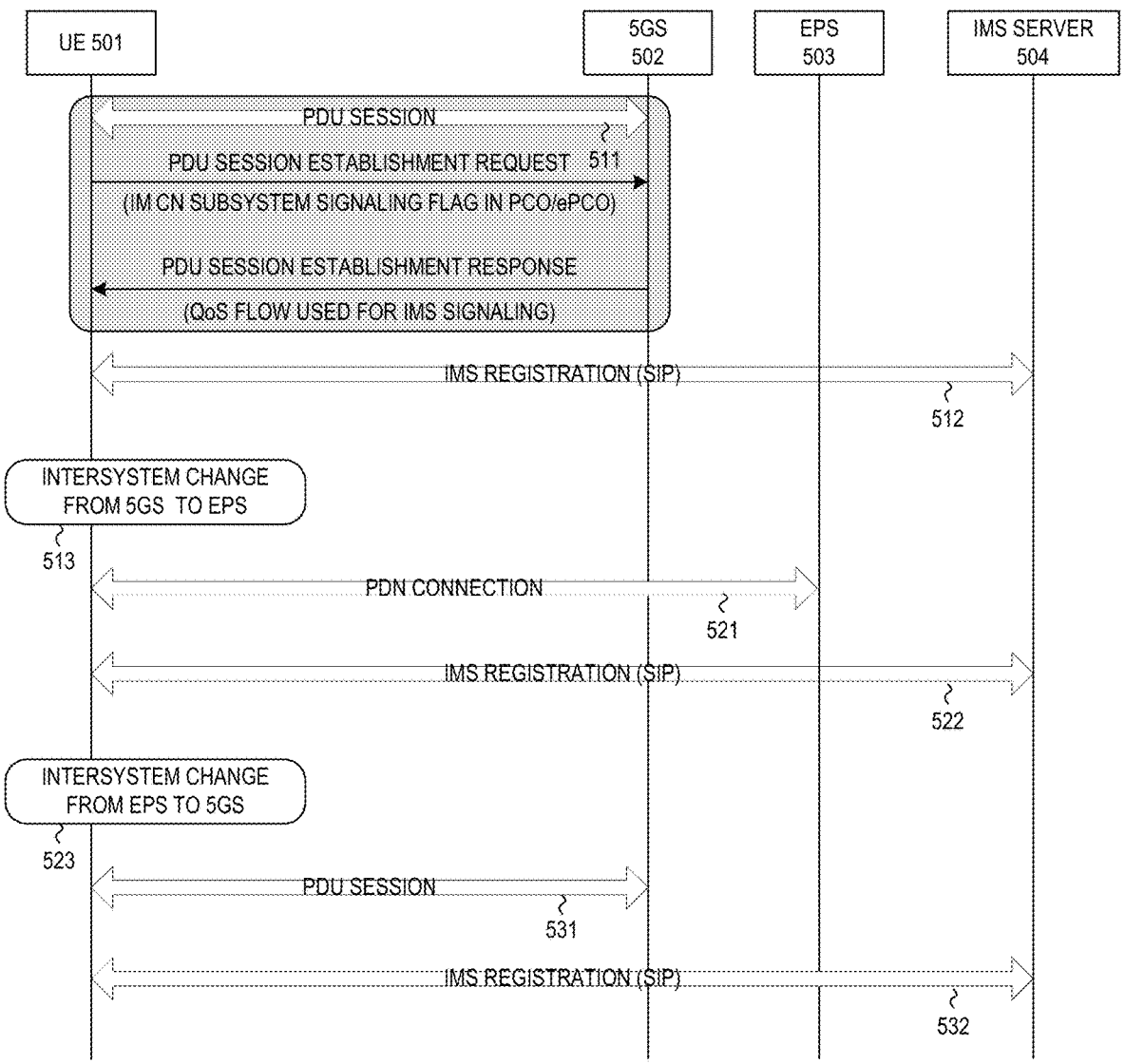
FIG. 5 illustrates a sequence flow between UE and network entity in 5GS/EPS for supporting IMS signaling after inter-system change between 5GS and EPS.

FIG. 5 illustrates a sequence flow between a UE and a network entity in 5GS/EPS for supporting IMS signaling after inter-system change between 5GS and EPS. In step 511, UE 501 establishes a PDU session in 5GS 502. During the PDU session establishment procedure, one or more QoS flow descriptions are added. UE 501 can set the IM CN Subsystem Signaling Flag in PCO/ePCO IE. Upon the PDU session is established, the QoS flow of the default QoS rule is used for IMS signaling. In step 512, UE 501 uses the QoS flow to perform IMS registration and receives IMS service from IMS server 504. In step 513, UE 501 performs inter-system change from 5GS to EPS. In step 521, the PDU session in 5GS is converted to a PDN connection in EPS 503, carrying the 5GSM parameters. The QoS flow used for IMS signaling is mapped to an associated EPS bearer, which is used for IMS registration and signaling in step 522. In step 523, UE 501 performs another inter-system change from EPS back to 5GS. In step 531, the PDN connection is converted back to the corresponding PDU session in 5GS. The QoS flow that includes the default QoS rule is used for IMS signaling in 5GS, regardless of which EPS bearer is used for IMS signaling in EPS. In step 532, UE uses the QoS flow of the default QoS rule to perform IMS registration and receives IMS service from IMS server 504.

Figure 6:
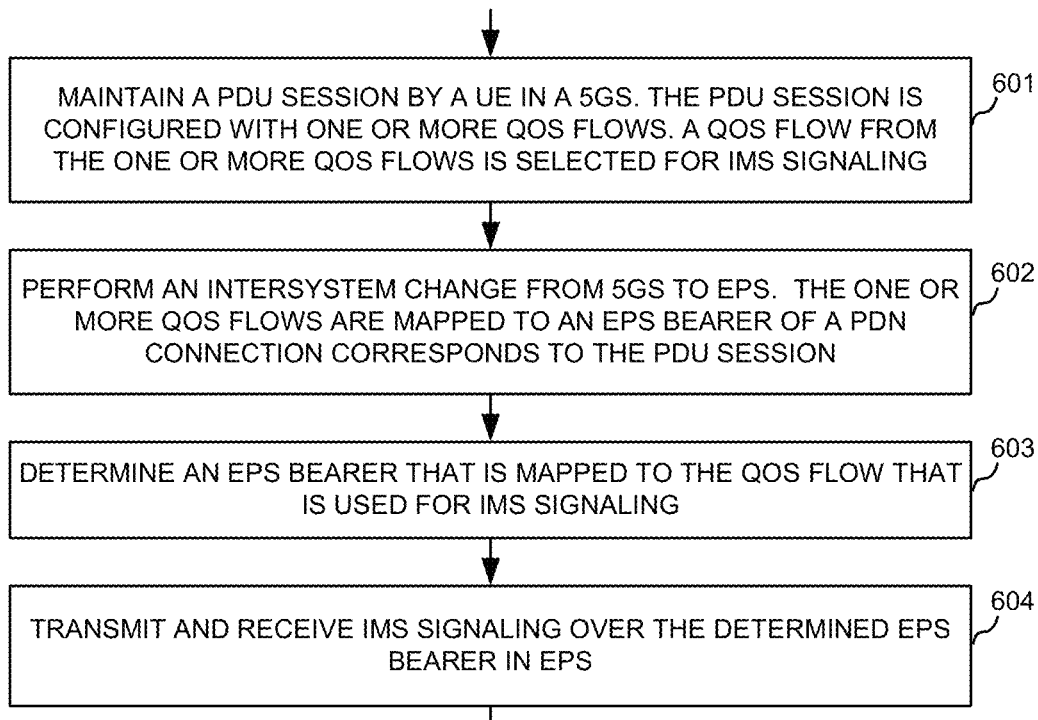
FIG. 6 is a flow chart of a method of supporting IMS signaling after inter-system change from 5GS to EPS in accordance with one novel aspect.

FIG. 6 is a flow chart of a method of supporting IMS signaling after inter-system change from 5GS to EPS in accordance with one novel aspect of the present invention. In step 601, a UE maintains a Protocol data unit (PDU) session in a 5G system (5GS). The PDU session is configured with one or more QoS flows and a QoS flow from the one or more QoS flows is selected for IP multimedia subsystem (IMS) signaling. In step 602, the UE performs an inter-system change from 5GS to an evolved packet system (EPS). The one or more QoS flows are mapped to an EPS bearer of a packet data network (PDN) connection corresponds to the PDU session. In step 603, the UE determines an EPS bearer that is mapped to the QoS flow that is used for IMS signaling. In step 604, the UE transmits and receives IMS signaling over the determined EPS bearer in EPS.

Figure 7:
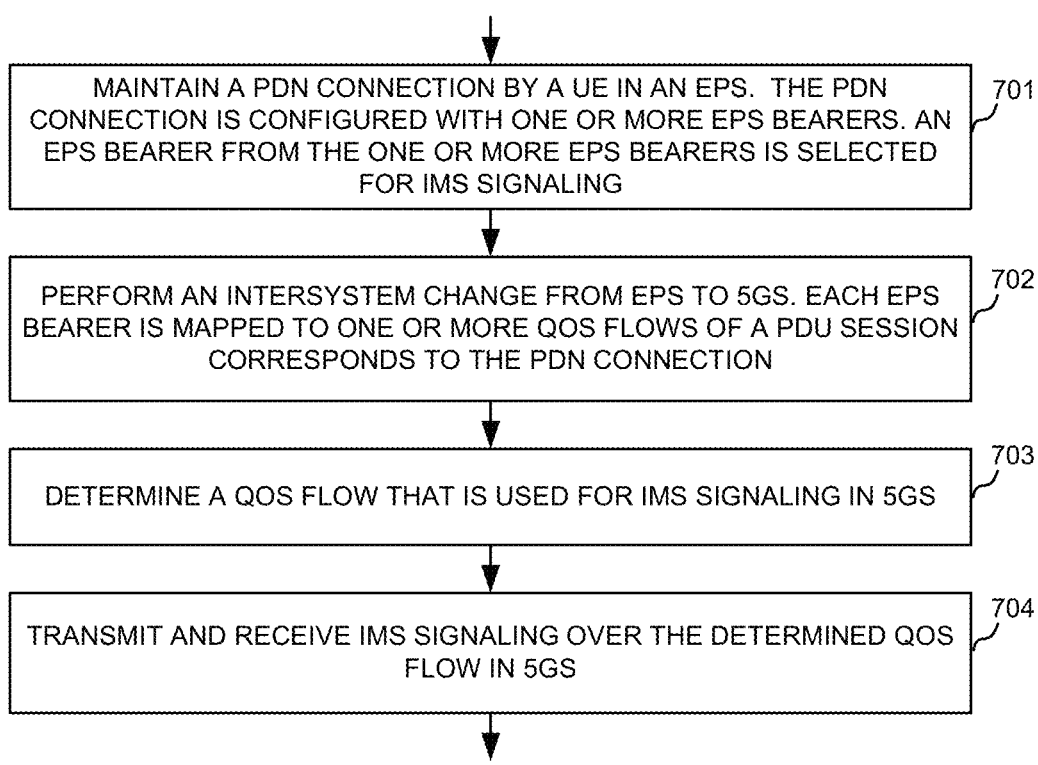
FIG. 7 is a flow chart of a method of supporting IMS signaling after inter-system change from EPS to 5GS in accordance with one novel aspect.

FIG. 7 is a flow chart of a method of supporting IMS signaling after inter-system change from EPS to 5GS in accordance with one novel aspect of the present invention. In step 701, a UE maintains a Packet data network (PDN) connection in an evolved packet system (EPS). The PDN connection is configured with one or more EPS bearers, and an EPS bearer from the one or more EPS bearers is selected for IP multimedia subsystem (IMS) signaling. In step 702, the UE performs an inter-system change from EPS to a 5G system (5GS). Each EPS bearer is mapped to one or more QoS flows of a protocol data unite (PDU) session corresponds to the PDN connection. In step 703, the UE determines a QoS flow that includes a default QoS rule to be used for IMS signaling for the PDU session in 5GS. In step 704, the UE transmits and receives IMS signaling over the determined QoS flow in 5GS.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
maintaining a Protocol data unit (PDU) session by a user equipment (UE) in a 5G system (5GS), wherein the PDU session is configured with one or more QoS flows, and wherein a QoS flow from the one or more QoS flows is selected for IP multimedia subsystem (IMS) signaling;
performing an inter-system change from 5GS to an evolved packet system (EPS), wherein the one or more QoS flows are mapped to an EPS bearer of a packet data network (PDN) connection corresponds to the PDU session;
determining an EPS bearer that is mapped to the QoS flow that is used for IMS signaling; and
transmitting and receiving IMS signaling over the determined EPS bearer in EPS.

2. The method of claim 1, wherein the EPS bearer is mapped to a single QoS flow, and wherein the single QoS flow is the QoS flow that is used for IMS signaling.

3. The method of claim 1, wherein the EPS bearer is mapped to multiple QoS flows, and wherein the multiple QoS flows include the QoS flow that is used for IMS signaling.

4. The method of claim 1, wherein the UE indicates an IM CN subsystem signaling flag when the PDU session is established.

5. The method of claim 1, wherein the UE receives an indication that the QoS flow is used for IMS signaling via an IM CN subsystem signaling flag.

6. The method of claim 5, wherein the indication is carried via an extended protocol configuration option (ePCO) information element (IE).

7. The method of claim 5, wherein the indication is carried via a 5G session management (5GSM) message.

8. The method of claim 1, further comprising:
performing inter-system change from EPS to 5GS, wherein the UE uses a QoS flow that comprises a default QoS rule for IMS signaling in 5GS.

9. A User Equipment (UE), comprising:
a Protocol data unit (PDU) session handling circuit that maintains a PDU session in a 5G system (5GS), wherein the PDU session is configured with one or more QoS flows, and wherein a QoS flow from the one or more QoS flows is selected for IP multimedia subsystem (IMS) signaling;
an inter-system change circuit that performs an inter-system change from 5GS to an evolved packet system (EPS), wherein the one or more QoS flows are mapped to an EPS bearer of a packet data network (PDN) connection corresponds to the PDU session;
an IMS management circuit that determines an EPS bearer that is mapped to the QoS flow that is used for IMS signaling; and
a transceiver that transmits and receives IMS signaling over the determined EPS bearer in EPS.

10. The UE of claim 9, wherein the EPS bearer is mapped to a single QoS flow, and wherein the single QoS flow is the QoS flow that is used for IMS signaling.

11. The UE of claim 9, wherein the EPS bearer is mapped to multiple QoS flows, and wherein the multiple QoS flows include the QoS flow that is used for IMS signaling.

12. The UE of claim 9, wherein the UE indicates an IM CN subsystem signaling flag when the PDU session is established.

13. The UE of claim 9, wherein the UE receives an indication that the QoS flow is used for IMS signaling via an IM CN subsystem signaling flag.

14. The UE of claim 13, wherein the indication is carried via an extended protocol configuration option (ePCO) information element (IE).

15. The UE of claim 13, wherein the indication is carried via a 5G session management (5GSM) message.

16. The UE of claim 9, wherein the UE performs an inter-system change from EPS to 5GS, wherein the UE uses a QoS flow that comprises a default QoS rule for transmitting and receiving IMS signaling in 5GS.

17. A method, comprising:
maintaining a Packet data network (PDN) connection by a user equipment (UE) in an evolved packet system (EPS), wherein the PDN connection is configured with one or more EPS bearers, and wherein an EPS bearer from the one or more EPS bearers is selected for IP multimedia subsystem (IMS) signaling;
performing an inter-system change from EPS to a 5G system (5GS), wherein each EPS bearer is mapped to one or more QoS flows of a protocol data unite (PDU) session corresponds to the PDN connection;
determining a QoS flow that includes a default QoS rule to be used for IMS signaling for the PDU session in 5GS; and
transmitting and receiving IMS signaling over the determined QoS flow in 5GS.

18. The method of claim 17, wherein the determined QoS flow is associated to the selected EPS bearer for IMS signaling in EPS.

19. The method of claim 17, wherein the determined QoS flow is not associated to the selected EPS bearer for IMS signaling in EPS.

* * * * *